United States Patent [19]

Nachtigall

[11] Patent Number: 5,142,646
[45] Date of Patent: Aug. 25, 1992

[54] GROUND FAULT ELECTRICAL PANEL

[76] Inventor: Carl Nachtigall, 880 McIvor Avenue, Winnipeg, Manitoba, Canada, R2G 2J9

[21] Appl. No.: 707,332

[22] Filed: May 29, 1991

[51] Int. Cl.⁵ .............................................. H02H 3/00
[52] U.S. Cl. ........................................ 361/42; 361/50; 361/46
[58] Field of Search ...................... 361/42, 46, 47, 49, 361/50

[56] References Cited

U.S. PATENT DOCUMENTS

| | | | |
|---|---|---|---|
| 3,764,853 | 9/1973 | Beachley | 317/18 D |
| 4,067,052 | 1/1978 | Neuhoff | 361/42 |
| 4,077,056 | 2/1978 | Galiana | 361/50 |
| 4,115,829 | 9/1978 | Howell | 361/42 |
| 4,233,640 | 11/1980 | Klein et al. | 361/44 |
| 4,258,403 | 3/1981 | Shimp | 361/42 |
| 4,649,454 | 3/1987 | Winterton | 361/50 |
| 4,685,022 | 8/1987 | Nichols et al. | 361/44 |
| 4,739,450 | 4/1988 | Misencik | 361/394 |
| 4,949,214 | 8/1990 | Spencer | 361/95 |

Primary Examiner—Steven L. Stephan
Assistant Examiner—Matthew Nguyen
Attorney, Agent, or Firm—Murray E. Thrift; Stanley G. Ade; Adrian D. Battison

[57] ABSTRACT

A circuit breaker panel system supplies power to plural circuits that are ground fault protected and plural circuits that are not ground fault protected. The panel system has two sections. One section, which is not ground fault protected, contains a ground fault circuit breaker that supplies power to the second section, so that the entire second section is ground fault protected.

10 Claims, 2 Drawing Sheets

GROUND FAULT ELECTRICAL PANEL

FIELD OF THE INVENTION

The present invention relates to circuit breaker panels and more particularly to a novel arrangement of circuit breaker panels to provide selective ground fault circuit protection.

BACKGROUND

In many electrical codes, it is now required to provide ground fault protection in certain circuits, for example outlets in a bathroom or adjacent kitchen sinks. This is conventionally done using ground fault interrupt (GFI) receptacles where protection is required. This arrangement suffers from certain disadvantages. The GFI receptacles are expensive and where a large number of ground fault protected circuits are required, significant additional cost is incurred when compared with standard receptacles. In a case where a split circuit is required, as for example with a kitchen counter receptacle, the conventional GFI receptacle cannot be used.

An alternative to the GFI receptacle is the use of a ground fault circuit breaker for each circuit to be protected. Again, the cost of such a system can be quite high where a number a circuits are to be protected.

The present invention is concerned with a novel arrangement for providing the desired multi-circuit ground fault protection.

SUMMARY

According to the present invention there is provided a circuit breaker panel apparatus for supplying power to a plurality of first load circuits and a plurality of second load circuits, and for providing ground fault protection for the second load circuits, said apparatus comprising:

first circuit breaker panel means for receiving line power and for distributing the power to the first load circuits through respective circuit breakers and to a ground fault circuit breaker;

second circuit breaker panel means for receiving line power from the ground fault circuit breaker of the first panel means and for distributing the power so received to the second load circuits through respective circuit breakers whereby a ground fault in any of the second load circuits will trip the ground fault circuit breaker.

The circuit breaker panel is thus divided in two. This division may be achieved with two physically separate panels or with a single panel electrically separated internally to provide the two circuit breaker sections. The ground fault protected section is supplied with power through the ground fault circuit breaker, so that all circuits connected to that section are ground fault protected. Circuits not requiring ground fault protection are connected to the first circuit breaker panel section.

Thus, full ground fault protection can be provided using a single ground fault circuit breaker. Wiring of the system is similar to that used in conventional systems. The ground fault protected circuits are connected to standard circuit breakers in the ground fault protected section of the panel, to an isolated neutral bar of the protected section and to a common ground.

Because tripping of the ground fault circuit breaker will cut out all of the ground fault protected circuits, it is preferred to have an alarm, either visual or sonic, to report the tripping of the breaker.

BRIEF DESCRIPTION OF THE DRAWINGS

In the accompanying drawings, which illustrate in exemplary embodiment of the present invention.

DETAILED DESCRIPTION

Figure 1:
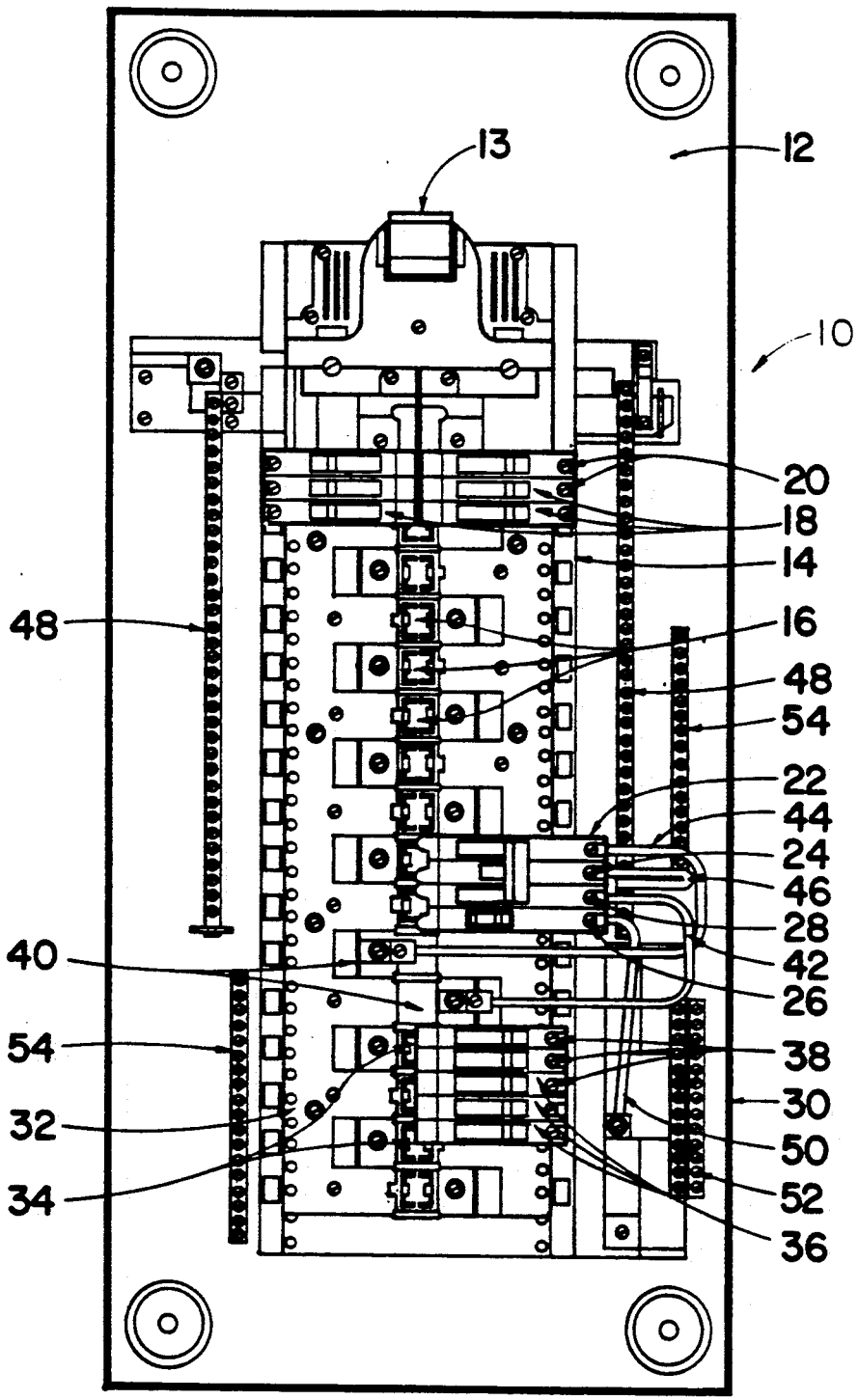
FIG. 1 is a front elevation of the circuit breaker panel equipped with ground fault protection according to the present invention.

Referring to the accompanying drawings and especially to FIG. 1 there is illustrated a circuit breaker panel 10 that includes the conventional sheet metal housing 12, which is illustrated with the cover removed. Within the housing are a main circuit breaker 13 and a bank of circuit breaker receptacles 14. Each of the receptacles is equipped with electrical connectors 16 for connecting a bus bar from the breaker 13 to a circuit breaker, such as the breakers 18. Each breaker has a load circuit terminal 20 for connection to the hot conductor of a load circuit. Also mounted in one of the circuit breaker receptacles 14 is a ground fault circuit breaker 22 of known-type. The illustrated breaker is a two-pole ground fault circuit breaker with a line neutral terminal 24, a load neutral terminal 26 and two load terminals 28 for supplying two different phases of AC-power.

The housing 12 also contains a ground fault protected section 30. This includes a bank of circuit breaker receptacles 32 with respective connectors 34 for supplying power to circuit breakers 36. Each of the circuit breakers has a load terminal 38.

The ground fault protected section of the panel has two load terminals 40 connected to the respective load terminals 28 of the ground fault circuit breaker 22 by jumpers 42 and 44. The line neutral terminal 24 of the ground fault circuit breaker 22 is connected by a jumper 46 to a neutral bar 48 in the unprotected section of the panel. The load neutral terminal 26 of the ground fault circuit breaker 22 is connected by a jumper 50 to a neutral bar 52 in the ground fault protected section 30 of the panel. The neutral bar 52 is electrically isolated from the neutral bar 48. The panel also includes two grounding bars 54 which are common to both sections of the panel.

Figure 2:
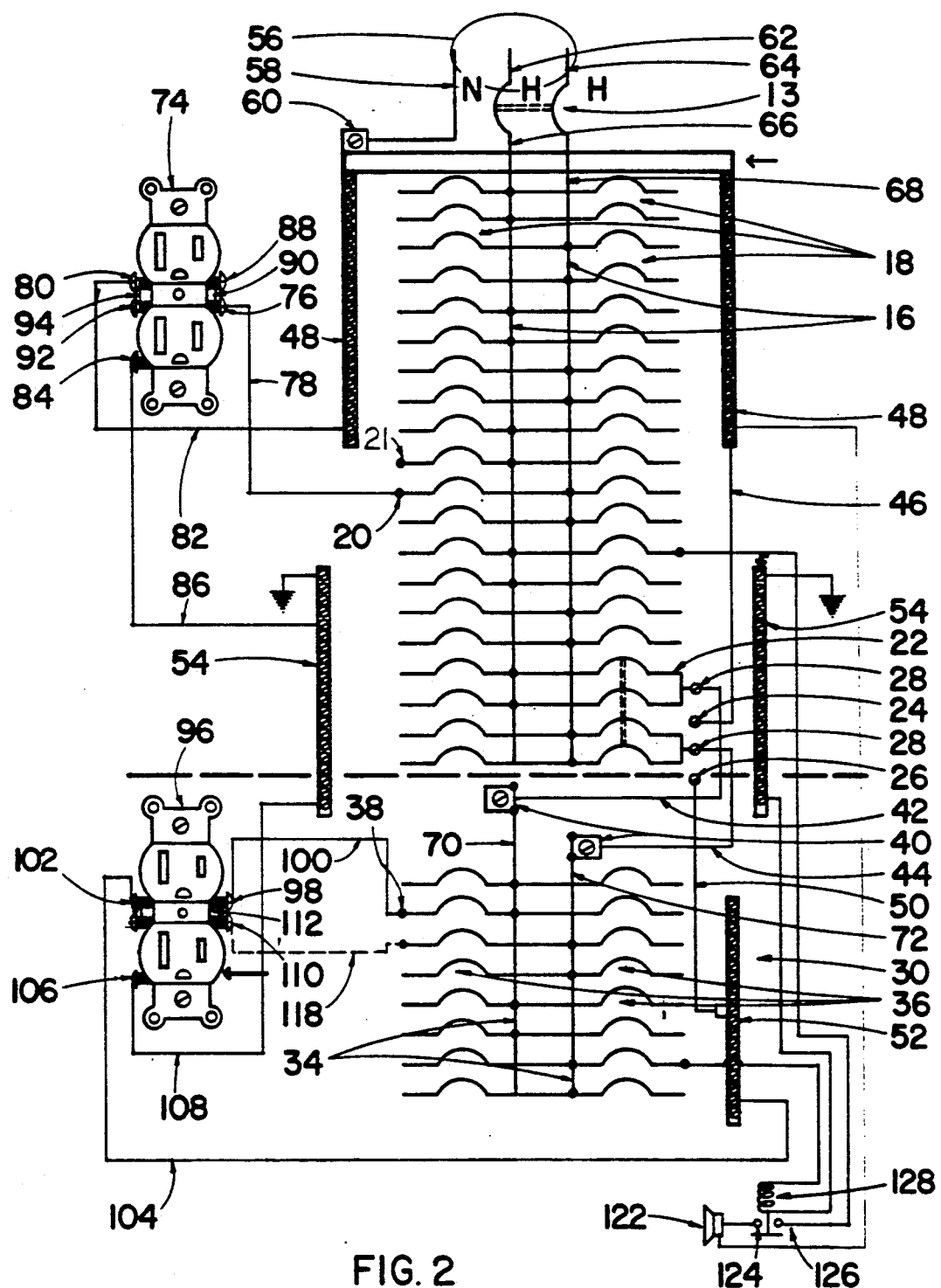
FIG. 2 is a schematic representation of the panel of FIG. 1.

Referring now more specifically to FIG. 2, the electrical layout of the panel and its connection to load circuits is illustrated. A power supply line 56 supplies power to the panel 10. A neutral conductor 58 of the supply line is connected to a terminal 60 of the neutral bar 48. The power line has two hot conductors 62 and 64 which are connected through circuit breaker 13 to bus bars 66 and 68 respectively that supply power to the circuit breaker receptacles 14 (FIG. 1). Each receptacle is connected to a respective one of the bus bars.

In the ground fault protected section 30 of the panel, there are two bus bars 70 and 72 which supply power through the connectors 34 (FIG. 1) to the circuit breaker receptacles 32. Bus bars 70 and 72 are connected to the respective load terminals 40.

A standard receptacle powered from the non-ground fault protected section of the panel is illustrated at 74. The receptacle has a hot terminal 76 connected by a line 78 to the terminal 20 of a circuit breaker 18. A neutral terminal 80 of the receptacle is connected through a line 82 to the neutral bar 48 and a ground terminal 84 is connected through a ground line 86 to a ground bar 54.

This wiring is conventional. If the receptacle is to be wired as a split plug the additional hot terminal 88 is isolated from the terminal 76 by removing jumper 90. Terminal 88 is then connected to a circuit breaker terminal 21. Terminals 20 and 21 are connected to separate phases of the power supply.

A similar receptacle 96 is shown connected to the ground fault protected section of the panel. The receptacle 96 has a hot terminal 98 connected to a circuit breaker terminal 38 by a line 100. A neutral terminal 102 is connected by a line 104 to the isolated neutral bar 52. The ground terminal 106 of the receptacle is connected by a ground line 108 to a ground bar 54. As with the receptacle 74, receptacle 96 has an additional hot terminal 110 that is connected to the terminal 98 by a jumper 112. For use as a split plug, it is simply necessary to disconnect the jumper and to provide an additional hot line 118 to a second circuit breaker of the other phase.

With a panel arranged in this way, the occurence of a ground fault in any circuit connected to the ground fault protected section 30 of the panel will trip the ground fault circuit breaker 22. Thus, with a single ground fault circuit breaker, all of the desired circuits may be ground fault protected.

In that the tripping of the ground fault protector 22 will shut off power to all of the ground fault protected circuits, it is useful to provide an alarm 122 to indicate when the breaker 22 has tripped. The alarm is powered through a circuit containing the normally closed contacts 124 of a relay 126. The relay coil 128 is supplied with power from the ground fault protected section 30, so that when power to that section is shut off, the contacts 124 will close actuating alarm 122. The alarm may be a visual alarm, for example a light or a sonic alarm, for example a bell or buzzer.

While one particular embodiment of the present invention has been described in the foregoing, it is to be understood that other embodiments are possible within the scope of the invention thus, while the panel has been described as a single panel with two separate sections, two independent panels may also be used in a similar way. It is therefore to be understood that the invention is to be considered limited solely by the scope of the appended claims.

Embodiments in which an exclusive property or privilege is claimed are defined as follows:

1. A circuit breaker panel apparatus for supplying power to a plurality of first load circuits and plurality of a second load circuits, and for providing ground fault protection for the second load circuits, said apparatus comprising:

first circuit breaker panel means having main supply terminal means for connection to a single power supply line, for receiving line power and a plurality of first circuit breaker receptacles for receiving plural standard circuit breakers and a single ground fault circuit breaker for distributing the power to the first load circuits through respective standard circuit breakers and to a ground fault circuit breaker;

second circuit breaker panel means having second supply terminal means connected to the ground fault circuit breaker for receiving line power from the ground fault circuit breaker of the first panel means and a plurality of second circuit breaker receptacles for receiving plural standard circuit breakers for distributing the power from the ground fault circuit breaker to the second load circuits through respective standard circuit breakers whereby a ground fault in any of the second load circuits will trip the ground fault circuit breaker.

2. A panel apparatus according to claim 1 wherein the first circuit breaker panel means includes a first neutral connector means for connection to a neutral conductor of the single power supply line and to a neutral line of each first load circuit.

3. A panel apparatus according to claim 2 wherein the second circuit breaker panel means includes a second neutral connector means for connection to a neutral line of each second load circuit, the second neutral connector means being electrically isolated from the first neutral connector means.

4. A panel apparatus according to claim 3 wherein the first circuit breaker panel means includes first ground connector means for connection to a ground line of each first load circuit.

5. A panel apparatus according to claim 4 wherein the second circuit breaker panel means includes second ground connector means for connection to a ground line of each second load circuit.

6. A panel apparatus according to claim 5 wherein the first and second ground means are electrically coupled.

7. A panel apparatus according to claim 1 wherein the first and second circuit breaker panel means comprise independent sections of a common panel.

8. A panel apparatus according to claim 1 including alarm means connected to the ground fault circuit breaker for generating an alarm when the ground fault circuit breaker is tripped.

9. A circuit breaker panel apparatus for supplying electrical power to a plurality of first load circuits and a plurality of second load circuits, and for providing ground fault protection for the second load circuits, said panel apparatus comprising:

circuit breaker panel;

a plurality of first circuit breaker receptacles in the panel;

first bus means electrically connected to the first circuit breaker receptacles;

input means for connecting the first bus means to hot conductors of a power supply line;

first neutral connector means for connection to a neutral conductor of the power supply line and to neutral conductors of the first load circuits;

first circuit breakers mounted in respective ones of the first circuit breaker receptacles, connected to the first bus means and connectable to hot conductors of the respective first load circuits;

a ground fault circuit breaker mounted in a first circuit breaker receptacle and connected to the first bus means, the ground fault circuit breaker having a line neutral terminal, a load neutral terminal and load hot terminal means;

neutral connector means electrically connecting the line neutral terminal of the ground fault circuit breaker to the first neutral connector means;

a plurality of second circuit breaker receptacles in the panel;

second bus means electrically connected to the second circuit breaker receptacles;

ground fault load connector means connecting the second bus means to the hot load terminal means of the ground fault circuit breaker;

second neutral connector means, electrically isolated from the first neutral connector means for connection to the load neutral terminal of the ground fault circuit breaker and to neutral conductors of the second load circuits;

second circuit breakers mounted in respective ones of the second circuit breaker receptacles; connected to the second bus means and connectable to hot conductors of the second load circuits; and ground means for connection to ground conductors of the load circuits.

10. A panel apparatus according to claim 9 including alarm means connected to the ground fault circuit breaker for generating an alarm when the ground fault circuit breaker is tripped.

* * * * *